US009556766B2

(12) United States Patent
Burkhardt et al.

(10) Patent No.: US 9,556,766 B2
(45) Date of Patent: Jan. 31, 2017

(54) METHOD AND DEVICE FOR OPERATING AN INTERNAL COMBUSTION ENGINE

(71) Applicant: Continental Automotive GmbH, Hannover (DE)

(72) Inventors: Thomas Burkhardt, Neutraubling (DE); Sebastian Viehoever, Regensburg (DE); Andreas Hofmann, Mitterfels (DE); Harsha Mahaveera, Coventry (GB); Jan-Richard Lenk, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 75 days.

(21) Appl. No.: 14/404,811

(22) PCT Filed: May 28, 2013

(86) PCT No.: PCT/EP2013/060964
§ 371 (c)(1),
(2) Date: Dec. 1, 2014

(87) PCT Pub. No.: WO2013/178630
PCT Pub. Date: Dec. 5, 2013

(65) Prior Publication Data
US 2015/0114326 A1    Apr. 30, 2015

(30) Foreign Application Priority Data

May 30, 2012  (DE) .......... 10 2012 209 107

(51) Int. Cl.
*F01M 13/02*  (2006.01)
*F02D 41/22*  (2006.01)
(Continued)

(52) U.S. Cl.
CPC .......... *F01M 13/023* (2013.01); *F02D 41/22* (2013.01); *F02D 41/221* (2013.01); *F01M 11/10* (2013.01);
(Continued)

(58) Field of Classification Search
CPC .... F01M 13/022; F01M 13/023; F01M 11/10; F01M 2013/0038; F01M 2013/0094; F02D 41/22; F02D 41/221; F02D 41/18; F02D 41/08; F02D 2200/0406; F02D 2200/0402; F02M 35/10222; F02M 35/10209
(Continued)

(56) References Cited

U.S. PATENT DOCUMENTS

| 5,974,870 A | 11/1999 | Treinies et al. ............ 73/114.33 |
| 6,247,464 B1 | 6/2001 | Maegawa et al. ............ 123/572 |

(Continued)

FOREIGN PATENT DOCUMENTS

| CN | 102216573 A | 10/2011 | ............. F01M 13/00 |
| DE | 19757345 A1 | 6/1998 | ............. F01M 13/02 |

(Continued)

OTHER PUBLICATIONS

Van Basshuyen et al., "Handbuch Verbrennungsmotor: Gundlagen, Komponenten, Systeme, Perspektiven," 2., verbesserte Auflage, Mit 1254 Abbildungen, pp. 557-559 (German w/ English Statement of Relevance), 2002.

(Continued)

*Primary Examiner* — Grant Moubry
(74) *Attorney, Agent, or Firm* — Slayden Grubert Beard PLLC

(57) ABSTRACT

An internal combustion engine has a crankcase and a crankcase ventilation system having a switchable shut-off valve, and sensors that detect different operating parameters (Continued)

of the engine, including a load variable of the engine. An estimated load parameter is determined based on the different detected operating parameters using a dynamic model, and a corrective value of a characteristic value is determined as a function of a deviation between the estimated load variable and the detected load variable. To implement a diagnosis, diagnosis switching cycle(s) are controlled, in which the shut-off valve is set to a closed switched position for a first time and set to an open switched position for a second time. A diagnosis value representative of a shut-off valve being in a correct or incorrect state is determined based on a change to the corrective value in response to the one or the plurality of diagnosis switching cycles.

10 Claims, 2 Drawing Sheets

(51) Int. Cl.
  *F01M 11/10* (2006.01)
  *F02D 41/08* (2006.01)
  *F02D 41/18* (2006.01)
  *F01M 13/00* (2006.01)

(52) U.S. Cl.
  CPC ....... *F01M 2013/0094* (2013.01); *F02D 41/08* (2013.01); *F02D 41/18* (2013.01); *F02D 2200/0402* (2013.01); *F02D 2200/0406* (2013.01); *Y02T 10/40* (2013.01)

(58) Field of Classification Search
  USPC ....... 123/572, 574, 41.86; 701/85, 103, 107; 73/114.01, 114.31, 114.33, 114.56, 73/114.58, 114.77
  See application file for complete search history.

(56) References Cited

U.S. PATENT DOCUMENTS

| | | | |
|---|---|---|---|
| 8,145,406 B2* | 3/2012 | Satou | F01M 13/0011 701/103 |
| 8,342,012 B2 | 1/2013 | Jach et al. | 73/114.32 |
| 8,469,010 B2 | 6/2013 | Inoue | 123/698 |
| 8,813,731 B2* | 8/2014 | Hattori | F01M 13/022 123/572 |
| 8,887,559 B2* | 11/2014 | Kuhn | F02D 41/22 73/114.33 |
| 2009/0090337 A1 | 4/2009 | Asanuma et al. | 123/574 |
| 2009/0211545 A1 | 8/2009 | Satou | 123/41.86 |
| 2009/0235907 A1 | 9/2009 | Satou | 123/574 |
| 2009/0241922 A1 | 10/2009 | Okada | 123/573 |

FOREIGN PATENT DOCUMENTS

| | | | | |
|---|---|---|---|---|
| DE | 102009001016 A1 | 10/2009 | | F01M 11/10 |
| DE | 10140987 B4 | 10/2010 | | B60K 15/035 |
| DE | 102009059662 A1 | 6/2011 | | G01M 15/04 |
| EP | 1895132 A1 | 3/2008 | | F02D 41/22 |
| WO | 97/35106 A2 | 9/1997 | | F02D 21/08 |
| WO | 2013/178630 A1 | 12/2013 | | F01M 13/02 |

OTHER PUBLICATIONS

International Search Report and Written Opinion, Application No. PCT/EP2013/060964, 16 pages, Jul. 15, 2013.
Chinese Office Action, Application No. 201380028746.7, 14 pages, Jul. 18, 2016.

* cited by examiner

METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2013/060964 filed May 28, 2013, which designates the United States of America, and claims priority to DE Application No. 10 2012 209 107.6 filed May 30, 2012, the contents of which are hereby incorporated by reference in their entirety.

TECHNICAL FIELD

The invention relates to a method and a device for operating an internal combustion engine having a crankcase and an intake tract. The intake tract has a throttle valve.

BACKGROUND

Within the scope of strict legal regulations relating to the emissions of pollutants emitted by motor vehicles, one important measure is aimed at ensuring that emissions of pollutants which occur in the respective cylinder of the internal combustion engine during the combustion of the air/fuel mixture are kept low. A further measure is also aimed at using, in internal combustion engines, exhaust gas post-treatment systems which convert the emissions of pollutants which are generated in the respective cylinders during the combustion process of the air/fuel mixture into innocuous substances. For this purpose, exhaust gas catalytic convertors are used which convert carbon monoxide, hydrocarbon and nitrogen oxides into innocuous substances.

Furthermore, it is also necessary to ensure that as few emissions of pollutants as possible are emitted from the respective motor vehicle in other ways.

In this context there is generally a need for corresponding monitoring, in particular within the scope of a diagnosis of components of the internal combustion engine and of components which are assigned to the internal combustion engine which are correspondingly relevant in terms of pollutants.

DE 197 573 45 discloses a blow-by gas duct abnormality-detection system for an internal combustion engine. Said system has an idling state-detection device for detecting whether the running state of the internal combustion engine is the idling state. In addition, said system has a leak-detection device for detecting leaking of a blow-by gas which comes from a blow-by gas duct which feeds the blow-by gas, which is generated at the internal combustion engine, into the intake duct, on the basis of a parameter which changes with a change in the airflow which is to be sucked into the internal combustion engine, if the idling state is detected by the idling state-detection device. Leaking of the blow-by gas is detected, for example, on the basis of an air/fuel ratio of the internal combustion engine or on the basis of an intake pressure of the internal combustion engine.

DE 10 140 987 B4 discloses an internal combustion engine of a motor vehicle having a fuel tank, an activated carbon filter which is connected thereto and which is connected to an intake pipe via a tank-venting valve, and having a crankcase vent. The crankcase vent is connected to the activated carbon container via a non-return valve with a throttle.

SUMMARY

One embodiment provides a method for operating an internal combustion engine having a crankcase and an intake tract with a throttle valve, wherein a first duct branches off from the intake tract upstream of the throttle valve and is pneumatically coupled to a free volume of the crankcase, or decoupled therefrom, as a function of a switched position of a switchable shut-off valve in the first duct, wherein a second duct opens into the intake tract downstream of the throttle valve, and the second duct is embodied in such a way that the free volume of the crankcase is pneumatically coupled to the intake tract via the second duct, wherein the internal combustion engine is assigned a plurality of sensors which each detect different operating variables which are assigned to the internal combustion engine and generate a measurement signal which represents the respective detected operating variable, wherein at least one of the sensors generates a measurement signal which is representative of a load variable of the internal combustion engine; in which at least one estimated load variable is determined by means of a dynamic model as a function of the various detected operating variables, and a correction value of a characteristic value is determined as a function of a deviation of the estimated load variable from the detected load variable, and the correction value and the characteristic value are used within the scope of the dynamic model; in which, in order to carry out a diagnosis of the shut-off valve, one or more diagnostic switching cycles are controlled, in which switching cycle or cycles the shut-off valve is set to a closed switched position for a predefined first time period, and the shut-off valve is set to an open switched position for a predefined second time period; and a diagnostic value which is representative of a satisfactory or non-satisfactory state of the shut-off valve is determined as a function of a change of the correction value in response to the one or more diagnostic switching cycles.

In a further embodiment, the characteristic value represents a reduced throttle cross section of the intake tract in the region of the throttle valve.

In a further embodiment, an estimated scavenging air mass flow through the second duct is made available during the execution of the diagnostic switching cycle or cycles and is taken into account within the scope of the dynamic model.

In a further embodiment, the diagnostic switching cycle or cycles is/are executed in an operating state of idling and/or of a low partial load.

In a further embodiment, the diagnostic switching cycle or cycles is/are executed in a quasi-steady-state operating mode.

Another embodiment provides a device for operating an internal combustion engine having a crankcase and an intake tract with a throttle valve, wherein a first duct branches off from the intake tract upstream of the throttle valve and is pneumatically coupled to a free volume of the crankcase, or decoupled therefrom, as a function of a switched position of a switchable shut-off valve in the first duct, wherein a second duct opens into the intake tract downstream of the throttle valve, and the second duct is embodied in such a way that the free volume of the crankcase is pneumatically coupled to the intake tract via the second duct, wherein the internal combustion engine is assigned a plurality of sensors which each detect different operating variables which are assigned to the internal combustion engine and generate a measurement signal which represents the respective detected operating variable, wherein at least one of the sensors generates a measurement signal which is representative of a load variable of the internal combustion engine, wherein the device is designed to execute a method as claimed in one of the preceding claims.

BRIEF DESCRIPTION OF THE DRAWINGS

Example embodiments of the invention are explained in more detail below with reference to the schematic drawings, in which.

DETAILED DESCRIPTION

Figure 1:
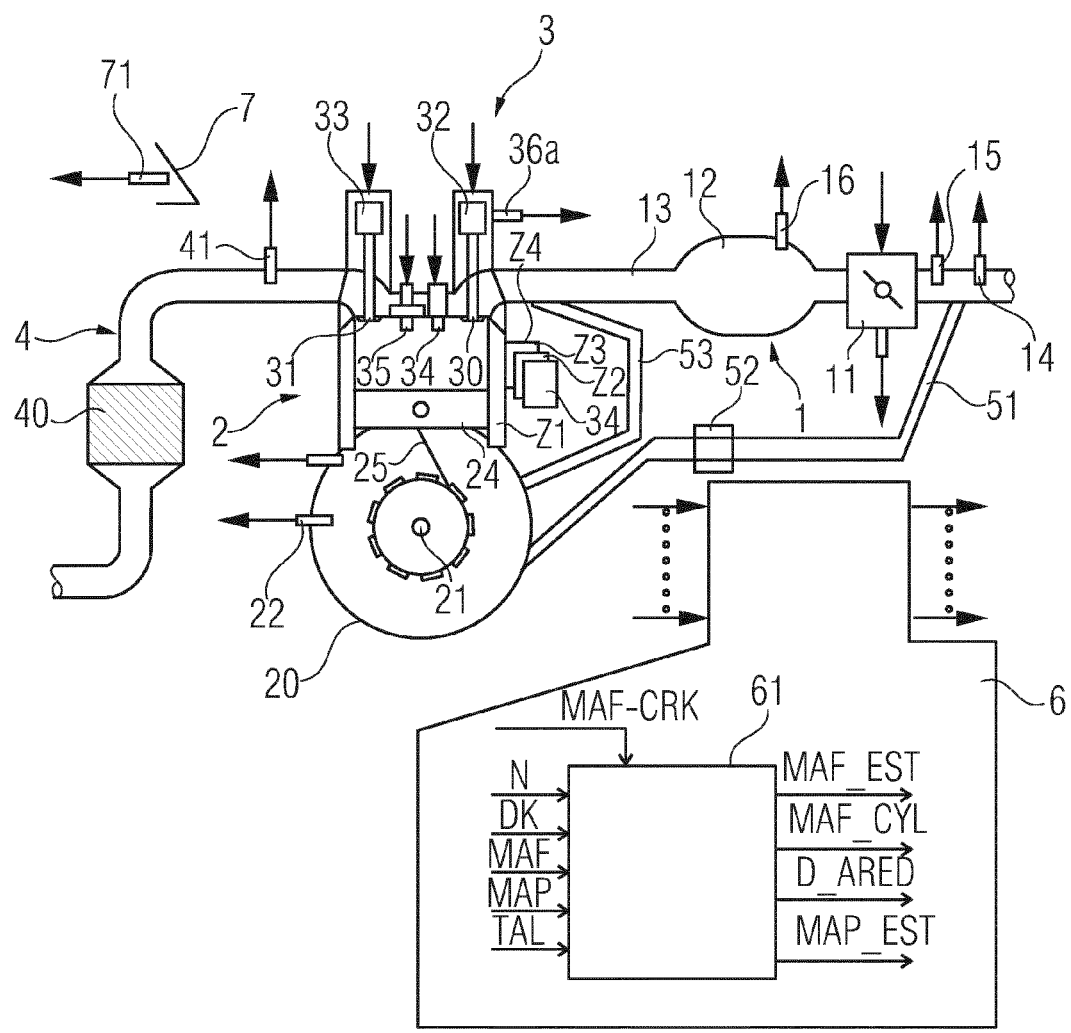
FIG. 1 shows an internal combustion engine with a control device.

Embodiments of the invention provide a method and a device for operating an internal combustion engine that provides a reliable operation of the internal combustion engine.

Embodiments provide a method and a corresponding device for operating an internal combustion engine having a crankcase and an intake tract with a throttle valve. A first duct branches off from the intake tract upstream of the throttle valve. The first duct is pneumatically coupled to a free volume of the crankcase, or decoupled therefrom, as a function of a switched position of a switchable shut-off valve in the first duct. A second duct opens into the intake tract downstream of the throttle valve. The second duct is embodied in such a way that the free volume of the crankcase is pneumatically coupled to the intake tract via the second duct.

In addition, the internal combustion engine is assigned a plurality of sensors which each detect different operating variables which are assigned to the internal combustion engine and generate a measurement signal which represents the respective detected operating variable. At least one of the sensors generates a measurement signal which is representative of a load variable of the internal combustion engine. At least one estimated load variable is determined by means of a dynamic model as a function of the various detected operating variables. A correction value of a characteristic value is determined as a function of a deviation of the estimated load variable from the detected load variable. The correction value and the characteristic value are used within the scope of the dynamic model.

The dynamic model comprises, in particular, the dynamic model of the intake tract, which is also referred to as an induction pipe model.

The load variable represents, in particular, an induction pipe pressure or an air mass flow. The dynamic model is, in particular, adapted by means of the correction value, specifically in the sense of approximating the detected and the estimated load variables.

In order to carry out a diagnosis of the shut-off valve, one or more diagnostic switching cycles are controlled, in which switching cycle or cycles the shut-off valve is set to a closed position for a predefined first time period, and the shut-off valve is set to an open switched position for a predefined second time period. A diagnostic value which is representative of a satisfactory or non-satisfactory state of the shut-off valve is determined as a function of a change of the correction value in response to the one or more diagnostic switching cycles. Said diagnostic value can then be used, for example, for storage in a fault memory in the case of the non-satisfactory state of the shut-off valve. The diagnostic value can be read out, for example, in a workshop. In addition, corresponding signaling of the diagnostic value to the vehicle driver can also alternatively or additionally take place.

Embodiments utilize the realization that during the operation of the internal combustion engine a small quantity of unburnt fuel and a significant quantity of exhaust gas flow into the crankcase as so-called blow-by from the cylinders via the piston rings and accumulate in the mixture of exhaust gas and air located there and in the oil. This gives rise to undesired properties. The properties of the oil can therefore change unfavorably as a result of the enrichment with fuel, for example as a result of thinning of the oil. In addition, in this way unburnt hydrocarbons can enter the surroundings. However, blow-by cannot be avoided by structural means.

In order to keep the specified negative effects of the blow-by as small as possible, the free volume of the crankcase can be vented into the intake tract by means of the first or second duct. Scavenging of the crankcase with corresponding fresh air which is sucked in via the first duct can be suitably set by means of the respective switched position of the switchable shut-off valve. Selective prevention of the scavenging of the crankcase is therefore necessary, for example, in order to adapt a fuel system, in particular for various operating states or operating situations, since the air entering the intake tract through the second duct may, under certain circumstances, be heavily enriched with fuel vapor. By switching off the ventilation the total quantity of the fuel vapor introduced during the diagnosis can be reduced. In this context, it is therefore also necessary to carry out the diagnosis of a shut-off valve.

As a result of the procedure for carrying out the diagnosis the dynamic model which is generally present in any case can be used easily in order thereby to be able to obtain definitive information about the satisfactory or non-satisfactory state of the shut-off valve in a particularly reliable way.

In addition, in this context use is made of the realization that by means of a suitable specification of the first and second time periods, depending on the configuration, a corresponding change in the correction value takes place during the diagnosis of the shut-off valve in the case of a satisfactory or then in the case of a non-satisfactory state and therefore the respective state, that is to say satisfactory or non-satisfactory, of the shut-off valve can be easily and reliably detected.

In this context it is advantageous if the characteristic value represents a reduced throttle cross section of the intake tract in the region of the throttle valve.

According to a further embodiment, an estimated scavenging air mass flow of the air mass flow through the second duct is made available during the execution of the diagnostic switching cycle or cycles and is taken into account within the scope of the dynamic model. In this way, it is possible to effectively avoid a situation in which an engine operating point is changed actively within the scope of the diagnosis, which entails the risk of the execution of the diagnosis being able to become perceptible to the vehicle driver in that, for example, the rotational speed of the engine, the engine noise or vehicle accelerations change significantly.

Likewise, in this way a contribution can be made to the fact that as a result of the fuel vapor or the exhaust gas which is input into the intake tract through the second duct during the diagnosis being correspondingly insufficiently taken into account during the determination and setting of the fuel mass to be metered corresponding emissions of pollutants are brought about which are compensated again, where appropriate with a delay, by a corresponding controller such as, for example, a lambda controller.

By virtue of the procedure according to this embodiment, a contribution can be made to the effect that an air/fuel ratio of the mixture in the respective cylinder can be set precisely in each case during the diagnosis and therefore there is no worsening, or only slight worsening, of the emissions of pollutants. Furthermore, reactions of the internal combustion engine which are undesired in terms of its drivability can also be avoided in this way.

In this embodiment, the advantage occurs that particularly in the satisfactory state of the shut-off valve insignificant worsening of the emissions of pollutants occurs during the execution of the diagnosis, while only under certain circumstances in the case of an non-satisfactory state does correspondingly relevant worsening of the emissions of pollutants occur during the diagnosis. Owing to the expected significantly less often occurrence of the non-satisfactory state, lower emission of pollutants can therefore be expected overall over the service life of the internal combustion engine.

According to a further embodiment, the diagnostic switching cycle or cycles is/are executed in an operating state of idling and/or of a low partial load. It has become apparent that these particular operating states are particularly suitable and permit particularly reliable diagnosis.

According to a further embodiment, the diagnostic switching cycles are executed in a quasi-steady-state operating mode. In this way, a particularly precise diagnosis is possible.

An internal combustion engine (FIG. 1) comprises an intake tract 1, an engine block 2, a cylinder head 3 and an exhaust gas tract 4. The intake tract 1 comprises a throttle valve 11, also a collector 12 and an induction pipe 13 which leads into the engine block 2 to a cylinder Z1 via an intake duct.

The engine block 2 also comprises a crankcase 20 which accommodates a crankshaft 21, and also a connecting rod 25, which is coupled to a piston 24 of the cylinder Z1, and which in this way couples the crankshaft 21 to the piston 24 of the cylinder Z1. The crankcase 20 is also partially filled with oil, that is to say engine oil, and furthermore comprises a free volume. The free volume can, under certain circumstances, also extend to the cylinder head 3.

The cylinder head 3 comprises a valve drive with a gas inlet valve 30 and a gas outlet valve 31 and valve drives 32, 33. The cylinder head 3 also comprises an injection valve 34 and a spark plug 35. Alternatively, the injection valve 34 can also be arranged in the intake tract 1.

The exhaust gas tract 4 comprises an exhaust gas catalytic convertor 40, which is embodied, for example, as a 3-way catalytic convertor.

In addition, a first duct 51 is provided which branches off from the intake tract 1 upstream of the throttle valve 11. Furthermore, a switchable shut-off valve 52 is arranged and embodied in such a way that the first duct 51 is pneumatically coupled to the free volume of the crankcase 20, or decoupled therefrom, as a function of the switched position of said shut-off valve 52. A second duct 53 opens into the intake tract 1 downstream of the throttle valve 11. The second duct 53 is embodied in such a way that the free volume of the crankcase 20 is pneumatically coupled to the intake tract 1 via the second duct. Venting of the free volume of the crankcase 20 can occur by means of the first and second ducts 51 and 53.

Moreover, a regulating valve which adapts an effective cross section of the second duct 53 automatically, specifically in such a way that a defined partial vacuum in relation to the ambient pressure is established in the crankcase 20, can be arranged in the second duct 53.

Given a suitable low pressure in the intake tract 1 downstream of the throttle valve 11, specifically in the area in which the second duct 53 opens into the intake tract 1, the gases which are located in the free volume of the crankcase 20 flow back into the intake tract 1 via the second duct 53 in a corresponding way. A pressure in the free volume of the crankcase 20 can be influenced by the respective switched position of the shut-off valve 52. Influence is therefore exerted as to whether and, if appropriate, to what degree scavenging air flows into the intake tract 1 through the second duct 53. As a result, by correspondingly actuating the shut-off valve 52 into its closed position it is possible, for example, to prevent the scavenging of the crankcase 20 under certain operating conditions.

In addition, a control device 6 is provided which is assigned sensors which each detect different operating variables which are assigned to the internal combustion engine and generate a measurement signal which represents the respective detected operating variable. At least one of the sensors generates a measurement signal which is representative of a load variable of the internal combustion engine. This is, in particular, an induction pipe pressure or an air mass flow.

The control device 6 is designed to actuate, as a function of at least one of the operating variables, actuating elements which are assigned to the internal combustion engine, and specifically to perform actuation by means of corresponding actuating drives for which corresponding actuating signals are generated for actuating said drives.

The control device 6 can therefore also be referred to as a device for operating the internal combustion engine.

The sensors are a pedal position sensor 71, which detects the position of an accelerator pedal 7, an air mass flow meter 14, which detects an air mass flow upstream of the throttle valve 11 as a detected air mass flow MAF, a temperature sensor 15 which detects an intake air temperature TAL, a pressure sensor 16 which detects an induction pipe pressure as a detected induction pipe pressure MAP, a crankshaft angle sensor 22 which detects a crankshaft angle, to which a rotational speed N is then assigned, and an exhaust gas probe 41 which detects a residual oxygen content of the exhaust gas and whose measurement signal is characteristic of the air/fuel ratio in the cylinder Z1 during the combustion of the air/fuel mixture.

Depending on the refinement, any desired subset of the specified sensors may be present, or additional sensors may also be present.

The actuating elements are, for example, the throttle valve 11, the gas inlet valve 30 and gas outlet valve 31, the injection valve 34, the spark plug 35 or the shut-off valve 52.

In addition to the cylinder Z1, further cylinders Z2 to Z4 are also provided and are then also assigned corresponding actuating elements. Each exhaust gas bank of cylinders, which can also be referred to as a cylinder bank, is preferably respectively assigned an exhaust gas section of the exhaust gas tract 4, and the respective exhaust gas section is correspondingly assigned an exhaust gas probe 41 in each case.

The control device 6 preferably comprises a computing unit and a memory for storing data and programs. One or more programs for operating the internal combustion engine, which can be processed during the operation of the internal combustion engine, are stored in the control device 6.

In addition, in this context a dynamic model is also provided in the computing unit, which dynamic model can also be embodied, for example, in the form of a program and which can also be referred to as an induction pipe model. The dynamic model is designed to determine at least one estimated load variable as a function of the various detected operating variables.

For this purpose, in particular the rotational speed N, a degree of throttle valve opening DK of the throttle valve 11, if appropriate the intake air temperature TAL and/or the detected air mass flow MAF and/or the detected induction pipe pressure MAP are fed to the input side of the dynamic model 61. Such a dynamic model is disclosed, for example, in the Handbuch Verbrennungsmotor [Internal Combustion Engine Manual], $2^{nd}$ edition, June 2002, Friedrich Vieweg & Sohn Verlagsgesellschaft mbH, Braunschweig/Wiesbaden, 2002, ISBN 3-528-13933-1 on pages 557 to 559, the content of which is herewith included in this regard. In addition, such a dynamic model is also disclosed in WO 97/35106 A2, the content of which is also herewith included in this regard.

In this context, the dynamic model can also have further input variables. In particular, an estimated induction pipe pressure is determined by means of the dynamic model as a function of the rotational speed N and the degree of throttle valve opening DK, wherein, for example, a pressure upstream of the throttle valve 11 is also taken into account. The estimated induction pipe pressure MAP_EST is therefore determined dynamically, and by means of the induction pipe pressure MAP_EST which is estimated in this way an estimated air mass flow MAF_CYL into the respective cylinder can be determined by taking into account the engine absorption curves, and a fuel mass which is to be metered can be determined as a function thereof, and a corresponding actuating signal for actuating the injection valve 34 can be generated.

Alternatively or additionally, an estimated air mass flow MAF_EST can also be determined, for example, in the area of the air mass sensor 14 by means of the dynamic model, in particular also as a function of the degree of throttle valve opening DK and of the engine rotational speed N.

Moreover, the dynamic model comprises a control process by means of which the estimated air mass flow MAF_EST is adapted to the detected air mass flow MAF and/or a control process by means of which the estimated induction pipe pressure MAP_EST is adapted to the detected induction pipe pressure MAP. In this context, a correction value for a characteristic value is determined, wherein both values are then used again within the scope of the dynamic model. A reduced throttle cross section of the intake tract in the area of the throttle valve is therefore used, for example, as a characteristic value, and the correction value D_ARED of the reduced throttle valve cross section is determined as a correction value, specifically as a controller actuating signal of a controller to which a deviation of the estimated air mass flow MAF_EST and of the detected air mass flow MAF or of the estimated induction pipe pressure MAP_EST and the detected induction pipe pressure MAP is fed.

The characteristic value can, for example, also be an induction pipe pressure upstream of the throttle valve 11, wherein the correction value in this case is correspondingly adapted, in particular in the case of a high load, by means of the controller. In contrast, the controller is activated with respect to the correction value D_ARED relating to the reduced throttle valve cross section in particular at a low load.

The dynamic model which is adjusted in this way constitutes an observer of the air mass which flows into the cylinder. Basically, the respective correction value constitutes a measure of the difference between the respective internal combustion engine and a reference internal combustion engine.

The scavenging air mass flow for scavenging the crankcase is approximately constant in a wide engine operating range since a constant partial vacuum is generally applied to the crankcase 20, the cross section of the first duct 51 is constant and the pressure downstream of an air filter, that is to say in the region of the branching off of the first duct 51, varies only slightly in this engine operating range. Basically, this usual scavenging air mass flow can be taken into account in the dynamic model in the case of the reduced throttle valve cross section, specifically with respect to the corresponding reference internal combustion engine.

Figure 2:
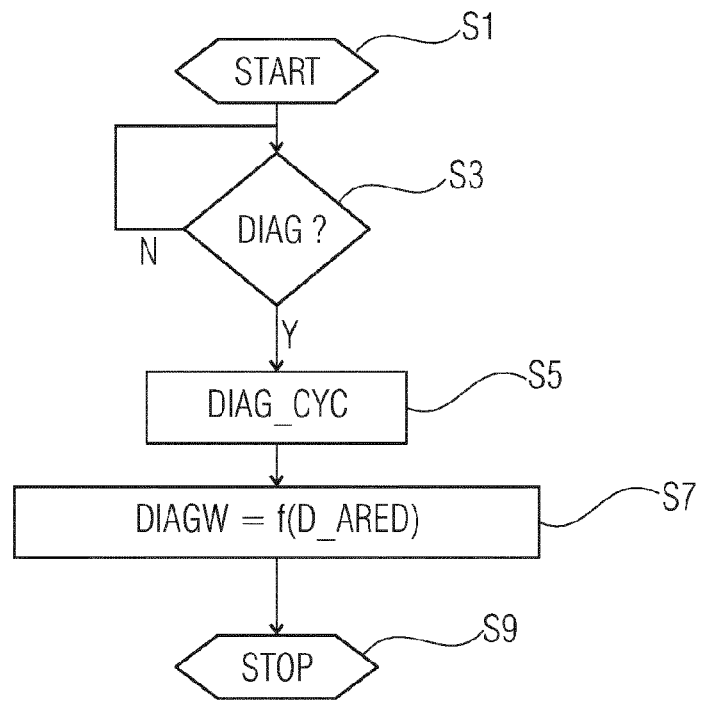
FIG. 2 shows a flowchart of a program for operating the internal combustion engine.

A method for operating the internal combustion engine which is used, in particular, for carrying out a diagnosis DIAG is started in a step S1 (FIG. 2) in which, if appropriate, variables are initialized.

In a step S3 it is checked whether conditions for the execution of the diagnosis DIAG are met. This may be the case, for example, if the internal combustion engine is in an operating state of idling or in an operating state of a low partial load and/or in a quasi-steady-state operating mode is present. Furthermore, a condition for carrying out the diagnosis DIAG may also be that a predefined time period since the last execution of the diagnosis DIAG has passed or a predefined distance has been travelled. If the conditions for the execution of the diagnosis in step S3 are not met, the processing is continued anew in step S3, if appropriate after a predefined waiting time period.

In contrast, if the condition of the step S3 is met, the processing is continued in a step S5 in which one or more diagnostic switching cycles DIAG_CYC are controlled, during which the shut-off valve 52 is set to a closed switched position for a predefined first time period, and the shut-off valve 52 is set to an open switched position for a predefined second time period. On the basis of FIG. 3, three such diagnostic switching cycles DIAG_CYC are represented on the basis of the signal profile SV1. In this context, the high level of the signal profile SV1 is representative of the open switched position of the shut-off valve 52 and the low level is representative of the closed switched position of the shut-off valve 52.

During the execution of the diagnostic cycles DIAG_CYC, a signal profile SV2 of the correction value D_ARED of the reduced throttle cross section is detected, and in a subsequent step S7 it is then used to determine a diagnostic value DIAGW which is representative of a satisfactory or non-satisfactory state of the shut-off valve 52. The diagnostic value DIAGW is therefore determined in the step S7 as a function of a change in the correction value D_ARED in response to the one or more diagnostic switching cycles DIAG_CYC.

In one refinement, in this context the respective switched position of the shut-off valve 52 is not taken into account in the dynamic model. This therefore leads to a corresponding reaction of the correction value D_ARED to the jumps in the signal profile SV1, as is apparent from FIG. 3. In this way, a shut-off valve 52 which is, for example, always actually in its open switched position can therefore be detected as non-satisfactory or else a shut-off valve 52 which is always in its closed switched position can be detected as non-satisfactory, since in this case no significant reaction of the signal profile SV2 of the correction value D_ARED occurs in response to the jumps in the signal profile SV2. As a result of suitable evaluation, for example by means of a comparison of the respective relevant changes with one or more predefined threshold values, the diagnostic value DIAGW can therefore be precisely determined.

In a second embodiment, an estimated scavenging air mass flow MAF_CRK is made available, and the latter is determined, for example, under the assumption that the shut-off valve 52 is also actually in the respective switched position. This then results in a situation in which given a satisfactory method of functioning of the shut-off valve 52 during the execution of the diagnostic cycles DIAG_CYC only an ultimately negligible change occurs in the correction value D_ARED, while in the case of a non-satisfactory method of functioning of the shut-off valve 52 a correspondingly significant change occurs in the profile SV2 of the correction value D_ARED. This can then be utilized to determine the diagnostic value DIAGW through, for example, comparisons with one or more corresponding predefined actuation values.

The diagnostic value DIAGW is then preferably stored, for example in a fault memory of the control device 6 in particular in the case of a detected non-satisfactory operation of the shut-off valve 52. Furthermore, corresponding signaling to the vehicle driver can also occur as a function of the diagnostic value.

The program is ended in a step S9.

Figure 3:
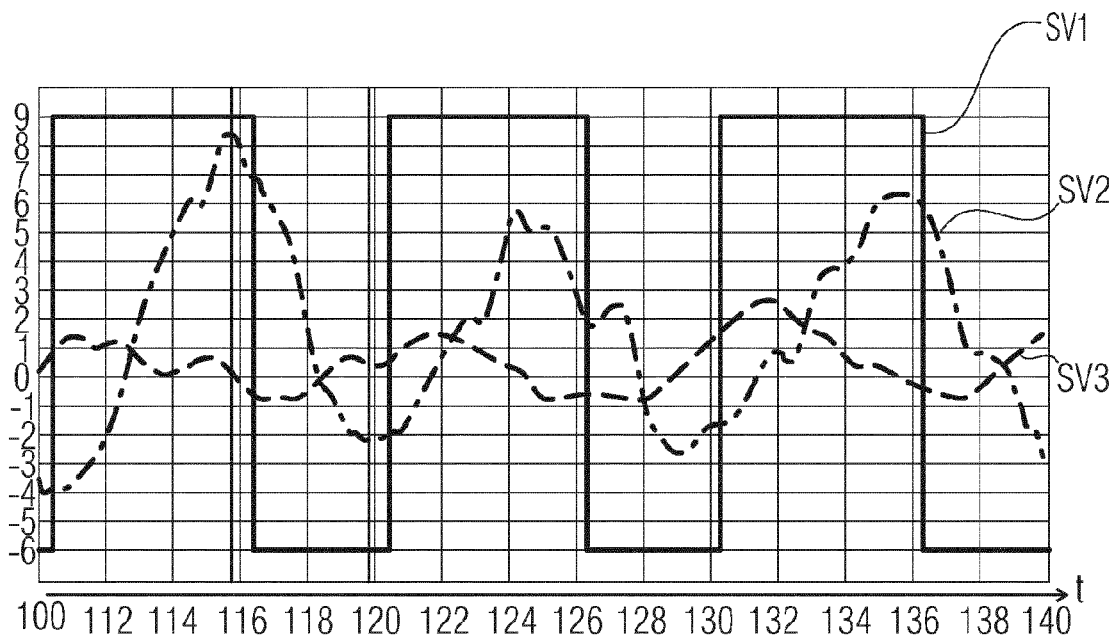
FIG. 3 shows a diagram in which various signal profiles are entered.

In addition, a signal profile SV3 of an actuating signal of a lambda controller is illustrated in FIG. 3.

LIST OF REFERENCE SYMBOLS

1 Intake tract
11 Throttle valve
12 Collector
13 Induction pipe
14 Air mass sensor
15 Temperature sensor
16 Induction pipe pressure sensor
2 Engine block
20 Crankcase
21 Crankshaft
22 Crankshaft angle sensor
24 Piston
25 Connecting rod
3 Cylinder head
30 Gas inlet valve
31 Gas outlet valve
32, 33 Valve drive
34 Injection valve
35 Spark plug
36a Camshaft angle sensor
4 Exhaust gas tract
40 Exhaust gas catalytic convertor
41 Exhaust gas probe
51 First duct
52 Shut-off valve
53 Second duct
6 Control device
61 Dynamic model of the intake tract
7 Accelerator pedal
71 Pedal position sensor
Z1-Z4 Cylinders
N Rotational speed
DK Degree of throttle valve opening
MAF Detected air mass flow
MAP Detected induction pipe pressure
TAL Intake air temperature
MAF_EST Estimated air mass flow
MAF_CYL Estimated air mass flow into cylinders
D_ARED Correction value of reduced throttle valve cross section
DIAG Diagnosis
DIAG_CYC Diagnostic switching cycle
DIAGW Diagnostic value
MAF_CRK Estimated scavenging air mass flow

What is claimed is:

1. A method for operating an internal combustion engine having a crankcase and an intake tract with a throttle valve, wherein a first duct branches off from the intake tract upstream of the throttle valve and is pneumatically coupled to or decoupled from a free volume of the crankcase as a function of a switched position of a switchable shut-off valve in the first duct, wherein a second duct opens into the intake tract downstream of the throttle valve, and the second duct is configured such that the free volume of the crankcase is pneumatically coupled to the intake tract via the second duct, wherein the internal combustion engine is assigned a plurality of sensors which each detect different operating variables which are assigned to the internal combustion engine and generate a measurement signal which represents the respective detected operating variable, and wherein at least one of the sensors generates a measurement signal which is representative of a load variable of the internal combustion engine, wherein the method comprises:
    determining, using a dynamic model:
        at least one estimated load variable as a function of the operating variables detected by the plurality of sensors,
        a correction value of a characteristic value as a function of a deviation of the estimated load variable from the detected load variable, wherein the characteristic value represents a reduced throttle cross section of the intake tract in the region of the throttle valve or an induction pipe pressure upstream of the throttle valve,
        wherein the correction value and the characteristic value are used by the dynamic model,
    controlling one or more diagnostic switching cycles to perform a diagnosis of the shut-off valve, wherein during the one or more switching cycles (a) the shut-off valve is set to a closed switched position for a predefined first time period, and (b) the shut-off valve is set to an open switched position for a predefined second time period, and
    determining a diagnostic value, which is representative of a satisfactory or non-satisfactory state of the shut-off valve, as a function of a change of the correction value in response to the one or more diagnostic switching cycles.

2. The method of claim 1, wherein the characteristic value represents the reduced throttle cross section of the intake tract in the region of the throttle valve.

3. The method of claim 1, wherein an estimated scavenging air mass flow through the second duct is made available during the execution of the diagnostic switching cycle or cycles and is taken into account by the dynamic model.

4. The method of claim 1, wherein the one or more diagnostic switching cycles are executed in at least one of an idling operating state and a low partial load operating state.

5. The method of claim 1, wherein the one or more diagnostic switching cycles are executed in a quasi-steady-state operating mode.

6. A control device for operating an internal combustion engine having a crankcase and an intake tract with a throttle valve, wherein a first duct branches off from the intake tract upstream of the throttle valve and is pneumatically coupled to a free volume of the crankcase, or decoupled therefrom, as a function of a switched position of a switchable shut-off valve in the first duct, wherein a second duct opens into the intake tract downstream of the throttle valve, and the second duct is embodied in such a way that the free volume of the crankcase is pneumatically coupled to the intake tract via the second duct, wherein the internal combustion engine is assigned a plurality of sensors which each detect different operating variables which are assigned to the internal combustion engine and generate a measurement signal which represents the respective detected operating variable, wherein at least one of the sensors generates a measurement signal which is representative of a load variable of the internal combustion engine, the control device comprising:

a computing unit, and a non-transitory memory storing computer instructions executable by the computing unit to perform a process including:

determining, using a dynamic model:

at least one estimated load variable as a function of the operating variables detected by the plurality of sensors, a correction value of a characteristic value as a function of a deviation of the estimated load variable from the detected load variable, wherein the characteristic value represents a reduced throttle cross section of the intake tract in the region of the throttle valve or an induction pipe pressure upstream of the throttle valve, wherein the correction value and the characteristic value are used by the dynamic model, controlling one or more diagnostic switching cycles to perform a diagnosis of the shut-off valve, wherein during the one or more switching cycles (a) the shut-off valve is set to a closed switched position for a predefined first time period, and (b) the shut-off valve is set to an open switched position for a predefined second time period, and determining a diagnostic value, which is representative of a satisfactory or non-satisfactory state of the shut-off valve, as a function of a change of the correction value in response to the one or more diagnostic switching cycles.

7. The control device of claim 6, wherein the characteristic value represents the reduced throttle cross section of the intake tract in the region of the throttle valve.

8. The control device of claim 6, wherein an estimated scavenging air mass flow through the second duct is made available during the execution of the diagnostic switching cycle or cycles and is taken into account by the dynamic model.

9. The control device of claim 6, wherein the one or more diagnostic switching cycles are executed in at least one of an idling operating state and a low partial load operating state.

10. The control device of claim 6, wherein the one or more diagnostic switching cycles are executed in a quasi-steady-state operating mode.

\* \* \* \* \*